United States Patent

Stühler et al.

[11] Patent Number: 6,110,611
[45] Date of Patent: Aug. 29, 2000

[54] PROCESS FOR OPERATION OF A PEM FUEL CELL UNIT

[75] Inventors: Walter Stühler, Hirschaid; Herbert Stenger, Burgthann; Martin Keim, Möhrendorf, all of Germany

[73] Assignee: Siemens Aktiengesellschaft, Munich, Germany

[21] Appl. No.: 09/283,904

[22] Filed: Apr. 1, 1999

Related U.S. Application Data

[63] Continuation of application No. PCT/DE97/02103, Sep. 18, 1997.

[30] Foreign Application Priority Data

Oct. 2, 1996 [DE] Germany ............ 196 40 808

[51] Int. Cl.⁷ .................................................. H01M 8/04
[52] U.S. Cl. .................................................. 429/13; 429/23
[58] Field of Search .................................. 429/13, 22, 23

[56] References Cited

U.S. PATENT DOCUMENTS

| | | | |
|---|---|---|---|
| 4,913,983 | 4/1990 | Cheiky | 429/22 X |
| 5,290,641 | 3/1994 | Harashima | 429/17 |
| 5,624,768 | 4/1997 | Tanokura | 429/23 |
| 5,877,600 | 3/1999 | Sonntag | 429/23 X |

FOREIGN PATENT DOCUMENTS

| | | |
|---|---|---|
| 0633157A1 | 1/1995 | European Pat. Off. . |
| 4201795A1 | 7/1993 | Germany . |
| 4318818A1 | 12/1994 | Germany . |
| 8-45525 | 2/1996 | Japan . |
| 2129237 | 5/1984 | United Kingdom ............ 429/22 |

OTHER PUBLICATIONS

"Fuel Cell Dynamics in Transit Applications", David H. Swan et al., Dec. 12, 1994, pp. 73–80.

Japanese Patent Abstract No. 63032868 (Chifumi), dated Feb. 12, 1988.

*Primary Examiner*—Stephen Kalafut
*Attorney, Agent, or Firm*—Herbert L. Lerner; Laurence A. Greenberg; Werner H. Stemer

[57] ABSTRACT

A process for operating a PEM fuel cell unit containing at least one PEM fuel cell block and a speed-controlled compressor connected upstream. To control changing an electrical current I of the PEM fuel cell block to a new reference value $I_{SN}$, a speed n of the compressor is set in a first step to a maximum value $n_M$ and in a second step is reduced to a speed $n_{SN}$ corresponding to the new reference value $I_{SN}$. By this expedient improved dynamics for brief and rapid load changes are achieved.

6 Claims, 1 Drawing Sheet

PROCESS FOR OPERATION OF A PEM FUEL CELL UNIT

CROSS-REFERENCE TO RELATED APPLICATION

This is a continuation of copending International Application PCT/DE97/02103, filed Sep. 18, 1997, which designated the United States.

BACKGROUND OF THE INVENTION

Field of the Invention

The invention pertains to a process for operation of a PEM fuel cell unit.

Fuel cells permit direct generation of electrical power from hydrogen and oxygen with much better efficiency and much lower pollutant emissions than ordinary power generators. Moreover, they operate almost without noise.

In addition to these fundamental advantages, the fuel cell with a solid plastic electrolyte (polymer electrolyte membrane (PEM)) has additional positive properties. These properties include a low operating temperature of less than 80° C., favorable overload behavior, limited voltage degradation and high lifetime, favorable load and temperature cycle behavior and the absence of a liquid corrosive electrolyte. In addition, it can also be used for operation with air from the surroundings instead of oxygen.

All of these properties make PEM fuel cells operable with air almost ideal current generators, for example, for exhaust-free electrical operation of vehicles.

PEM fuel cells are not operable by themselves. A PEM fuel cell block, containing a number of PEM fuel cells, an operating part and connected modular electronics are therefore assembled into a PEM fuel cell module. The equipment for supplying hydrogen $H_2$ and air, for product water takeoff, for removal of waste heat, for moistening of the reactants and for separation of gas pollutants is combined in the operating part.

Important features that characterize the operation of the PEM fuel cell unit with air are the air ratio $\lambda$ and volumetric air flow rate $V_L$. The volumetric air flow rate $V_L$ is a gauge of the amount of air flowing through the PEM fuel cell block. The air ratio $\lambda$ gives the additional air requirement during the reaction, if air from the surroundings is used instead of pure oxygen $O_2$.

The required dynamics for brief and rapid load changes have proven to be a problem during operation of PEM fuel cell units. An air supply for an air-operated fuel cell system is known from Published, Non-Prosecuted German Patent Application 43 18 818 A, corresponding to U.S. Pat. Nos. 5,434,016, 5,432,020 and 5,645,950, which uses a compressor. The compressor operates according to the displacement principle with a gap-sealed displacer. It also operates oil-free and has a speed spread of at least 1:10. By using a permanently excited synchronous motor, good partial load behavior of the compressor is achieved. However, the Non-Prosecuted Patent Application only describes the components with which this partial load behavior can be achieved.

SUMMARY OF THE INVENTION

It is accordingly an object of the invention to provide a process for operation of a PEM fuel cell unit that overcomes the above-mentioned disadvantages of the prior art devices of this general type.

With the foregoing and other objects in view there is provided, in accordance with the invention, an improved process for operating a polymer electrolyte membrane (PEM) fuel cell unit with at least one PEM fuel cell block and a speed-controlled compressor connected upstream of the at least one PEM fuel cell block, the improvement which includes: controlling a change of an electrical current I of the PEM fuel cell block to a new larger reference value $I_{SN}$ by setting a speed n of the speed-controlled compressor to a stipulated maximum value $n_M$ in a first step, the stipulated maximum value $n_m$ of the speed n being greater than a value $n_{SN}$ of the speed n corresponding to the new larger reference value $I_{SN}$ of the electrical current I; and reducing the speed n of the speed-controlled compressor in a second step to the value $n_{SN}$ of the speed corresponding to the new larger reference value $I_{SN}$.

The underlying task of the invention is therefore to provide a process for driving a PEM fuel cell unit that offers an operating mode for a compressor in order to achieve better dynamics for brief and rapid load changes.

The task is solved according to the invention by a process for operating the PEM fuel cell unit that contains at least one PEM fuel cell block and a speed-controlled compressor connected upline, in which the speed n of the compressor is set at a maximum value $n_M$ in a first step to control the electrical current I of the PEM fuel cell unit to a new reference value $I_{SN}$ and reduced in a second step to a speed $n_{SN}$ corresponding to the new reference value $I_{SN}$ of the electrical current I of the PEM fuel cell block.

Improved dynamics for brief and rapid load changes are achieved by the process. It is therefore particularly suited for an electrical drive of vehicles, for example, for operation of a forklift.

The electrical current I of the PEM fuel cell block is preferably continuously recorded as a control quantity by a current feedback sensor. During control, the electrical current I is recorded continuously as the quantity to be controlled, compared with another quantity, the reference quantity, and influenced in the direction of adjustment to the reference quantity. A characteristic of the control is the closed process in which the electrical current I is continuously influenced by itself as a control quantity in the loop of the control circuit.

The new reference value $I_{SN}$ of the electrical current I of the PEM field cell block is stipulated as the reference quantity by a set-point adjuster.

In another embodiment the electrical current I is compared continuously as the control quantity with the new reference value $I_{SN}$ of the electrical current I.

The electrical current I of the PEM fuel cell block is preferably influenced as a function of the speed n of the compressor.

In particular, an air valve connected after the PEM fuel cell block is adjusted so that at maximum speed $n_M$ of the compressor and at maximum electrical current I of the PEM fuel cell block, the volumetric air flow $V_L$ through it corresponds to a stipulated air ratio $\lambda$. By this expedient, optimized operating conditions are created for the PEM fuel cell unit, like appropriate operating pressure of the working medium in the PEM fuel cell block or constancy of the air ratio $\lambda$ with varying electrical current I, by controlling the speed n of the compressor.

Other features which are considered as characteristic for the invention are set forth in the appended claims.

Although the invention is illustrated and described herein as embodied in a process for operation of a PEM fuel cell unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING:

The single FIGURE of the drawing is a diagrammatic block diagram of a PEM fuel cell unit with a PEM fuel cell block and a speed-controlled compressor connected upstream according to the invention.

Figure 1:
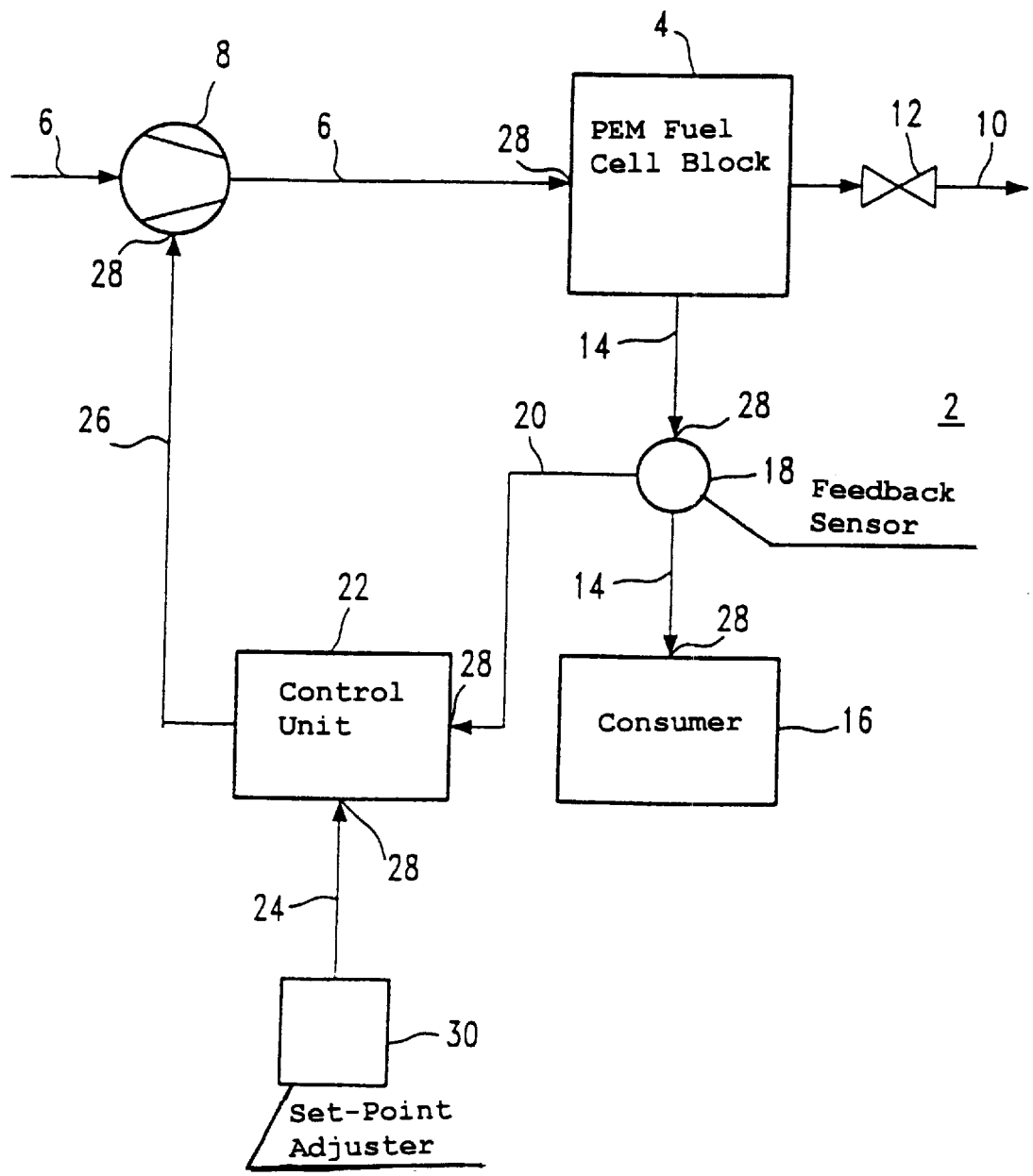

DESCRIPTION OF THE PREFERRED EMBODIMENTS:

Referring now to the single figure of the drawing in detail, there is shown a PEM fuel cell unit 2 contains a PEM fuel cell block 4 assembled from a number of PEM fuel cells. The PEM fuel cell unit 2, for example, is part of an electrically operated vehicle, for example, a car, a bus or a forklift.

Hydrogen $H_2$ and air from the surroundings are used as an operating medium, for example, to drive the PEM fuel cell unit 2.

Air is fed into the PEM fuel cell block 4 via an inlet 6 for electrochemical reaction within the PEM fuel cell block 4. A speed-controlled compressor 8 is connected in the inlet 6 upstream of the PEM fuel cell block 4 in order to provide the appropriate volumetric air flow rate $V_L$ for the PEM fuel cell block 4.

The air not consumed during the electrochemical reaction in the PEM fuel cell block 4 is discharged from it via an outlet 10. An air valve 12 is disposed in the outlet 10. The air valve 12 connected downstream of the PEM fuel cell block 4 in the outlet 10 is set so that at maximum speed $n_M$ of the speed-controlled compressor 8 and at maximum electrical current I of the PEM fuel cell block 4 the volumetric air flow rate $V_L$ through the PEM fuel cell block 4 corresponds to a stipulated air ratio $\lambda$.

The electrical current I generated in the PEM fuel cell block 4 during the electrochemical reaction is supplied via an electrical line 14 to a consumer 16. The consumer 16, for example, is the electric motor of the electrically driven vehicle.

A current feedback sensor 18 for continuous recording of the electrical current I of the PEM fuel cell block 4 is connected in electrical line 14 between the PEM fuel cell block 4 and consumer 16.

The electrical current I of the PEM fuel cell block 4 is switched to a control unit 22 via a line 20 as a control quantity. In addition, a new reference value $I_{SN}$ of the electrical current I is switched as a reference quantity for the consumer 16 to the control unit 22 via a signal line 24 with a set-point adjuster 30. The set-point adjuster 30 in an electrically operated vehicle is, for example, the gas pedal.

The electrical current I of the PEM fuel cell block 4, which is continuously recorded with the current sensor 18, is continuously compared in the control unit 22 with the new reference value $I_{SN}$ of the electrical current I.

As an output signal of the control unit 22 a speed $n_{SN}$ for the speed-controlled compressor 8 adjusted to the new reference value $I_{SN}$ is switched to the compressor via an electrical signal line 26. If the speed-controlled compressor 8 is now operated with the speed $n_{SN}$, a volumetric air flow rate $V_L$ is fed into the PEM fuel cell block 4 which permits this to generate the new reference value $I_{SN}$ of electrical current I and supply it to the consumer 16.

The loop that controls the electrical current I of the PEM fuel cell block 4 is thus composed of the electrical line 14, the current feedback sensor 18, the consumer 16, the electrical signal line 20, the control unit 22, the set-point adjuster 30 with the electrical signal line 24, the electrical signal line 26, the speed-controlled compressor 8 and the part of the inlet 6 disposed between the compressor 8 and the PEM fuel cell block 4. The direction of action is shown by arrows 28.

In this process for operating the PEM fuel cell unit 2, to control the electrical current I the PEM fuel cell block 4 from a first to a second reference value, in other words to the new reference value $I_{SN}$, the speed n of the compressor 8 is set in a first step at a maximum value nm and reduced in a second step to a speed $n_{SN}$ corresponding to the new reference value $I_{SN}$ of the electrical current I of the PEM fuel cell block 4.

During control a control quantity I is continuously compared with the reference quantity $I_{SN}$. Adjustment of control quantity I to the reference quantity $I_{SN}$ occurs in control unit 22 according to Faraday's law:

$$V_L = \lambda * \frac{0.2091}{0.21} * I * n_B * \frac{T_L}{273.15},$$

in which $V_L$ is the volumetric air flow rate through the PEM fuel cell block 4 in 1/h, $\lambda$ is the air ratio, 0.2091*I*n is the volumetric flow rate of oxygen $O_2$ in 1/h through the fuel cell block 4 calculated according to Faraday's law, I is the electrical current generated in the PEM fuel cell block 4 and measured in amps, $n_B$ is the number of PEM fuel cells in the PEM fuel cell block 4, 0.21 is the volume fraction of oxygen $O_2$ in the air, and $T_L$ is the temperature of the air flowing through the PEM fuel cell block 4 in K.

A specified value $V_L$ of the volumetric air flow rate through the PEM fuel cell block 4, which is necessary to generate electrical current I, therefore corresponds to each value I of the electrical current generated in the PEM fuel cell block 4.

In addition, an apparatus characteristic curve for the speed-controlled compressor 8 is entered in the control unit, which gives the volumetric air flow rate $V_L$ produced by the compressor 8 and fed into the PEM fuel cell block 4 at each speed n.

As an initial quantity of the control unit 22, an adjusted speed $n_{ref}$ is therefore switched to the speed-controlled compressor 8. The speed-controlled compressor 8 corresponds to a specified volumetric flow rate $V_L$ to generate the new reference value $I_{SN}$ of electrical current I in the PEM fuel cell block 4 according to Faraday's law and the apparatus characteristic curve.

Improved dynamics are achieved by this operating mode for brief and rapid load changes. It is therefore particularly suited for the electrical drive of vehicles.

What is claimed is:

1. An improved process for operating a polymer electrolyte membrane (PEM) fuel cell unit with at least one PEM fuel cell block and a speed-controlled compressor connected upstream of the at least one PEM fuel cell block, the improvement which comprises:

controlling a change of an electrical current of the PEM fuel cell block from a value I to a new larger reference value $I_{SN}$ in a first step by setting a speed n of the speed-controlled compressor to a stipulated maximum value $n_M$ in the first step, the stipulated maximum value $n_M$ of the speed n being greater than a value $n_{SN}$ of the speed n corresponding to the new larger reference value $I_{SN}$ of the electrical current; and reducing the speed n of the speed-controlled compressor in a second step to the value $n_{SN}$ of the speed corresponding to the new larger reference value $I_{SN}$.

2. The process according to claim 1, which comprises recording continuously the electrical current of the at least one PEM fuel cell block as a control quantity with a current actual value sensing and recording device.

3. The process according to claim 2, which comprises stipulating the new larger reference value $I_{SN}$ of the electrical current of the at least one PEM fuel cell block as a reference quantity by a set-point adjuster.

4. The process according to claim 3, which comprises comparing continuously the electrical current as the control quantity with the new larger reference value $I_{SN}$ of the electrical current I as the reference quantity.

5. The process according to claim 4, which comprises influencing the electrical current of the at least one PEM fuel cell block in dependence on the speed n of the speed-controlled compressor.

6. The process according to claim 1, which comprises setting an air valve connected downstream of the at least one PEM fuel cell block so that, at the stipulated maximum speed nm of the speed-controlled compressor and at a maximum electrical current Imax of the at least one PEM fuel cell block, a volumetric air flow rate through the at least one PEM fuel cell block corresponds to a stipulated air ratio $\lambda$.

* * * * *